United States Patent
Lennartz et al.

(10) Patent No.: US 7,066,969 B2
(45) Date of Patent: Jun. 27, 2006

(54) DYES INCORPORATING ANNIONIC AND CATIONIC GROUPS

(75) Inventors: Michael Lennartz, Lörrach (DE); Dölf Käser, Bottmingen (CH); Sandra Weiss, Lörrach-Brombach (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 165 days.

(21) Appl. No.: 10/484,135

(22) PCT Filed: Jul. 11, 2002

(86) PCT No.: PCT/EP02/07732

§ 371 (c)(1),
(2), (4) Date: Jan. 17, 2004

(87) PCT Pub. No.: WO03/010239

PCT Pub. Date: Feb. 6, 2003

(65) Prior Publication Data

US 2004/0205912 A1    Oct. 21, 2004

(30) Foreign Application Priority Data

Jul. 20, 2001    (EP)    ................... 01810719

(51) Int. Cl.
*D06P 1/06*    (2006.01)
*C09B 44/08*    (2006.01)

(52) U.S. Cl. ........................ 8/673; 8/682; 8/683; 8/919; 534/580; 534/604

(58) Field of Classification Search .................... None
See application file for complete search history.

(56) References Cited

U.S. PATENT DOCUMENTS

| | | | | |
|---|---|---|---|---|
| 4,273,707 A | * | 6/1981 | Pedrazzi | 534/797 |
| 4,363,761 A | * | 12/1982 | Pedrazzi | 534/803 |
| 4,367,172 A | * | 1/1983 | Pedrazzi | 534/797 |
| 4,544,737 A | * | 10/1985 | Stohr et al. | 534/605 |
| 5,772,745 A | * | 6/1998 | Gregory et al. | 106/31.48 |
| 5,929,215 A | * | 7/1999 | Pedrazzi | 534/604 |
| 2004/0158049 A1 | | 8/2004 | Lehr et al. | 534/630 |

FOREIGN PATENT DOCUMENTS

GB    2308376    *    6/1997

* cited by examiner

*Primary Examiner*—Margaret Einsmann
(74) *Attorney, Agent, or Firm*—Kevin T. Mansfield

(57) ABSTRACT

The present invention relates to novel compounds of the formulae A, $D_1$, $D_2$, $R_1$ and n are as defined in the description the compounds being in an internal or external salt form, or mixtures of compounds (1) and (2), a process for their preparation and preparations containing them used for dyeing paper.

17 Claims, No Drawings

DYES INCORPORATING ANNIONIC AND CATIONIC GROUPS

The present invention relates to dyes of the formula

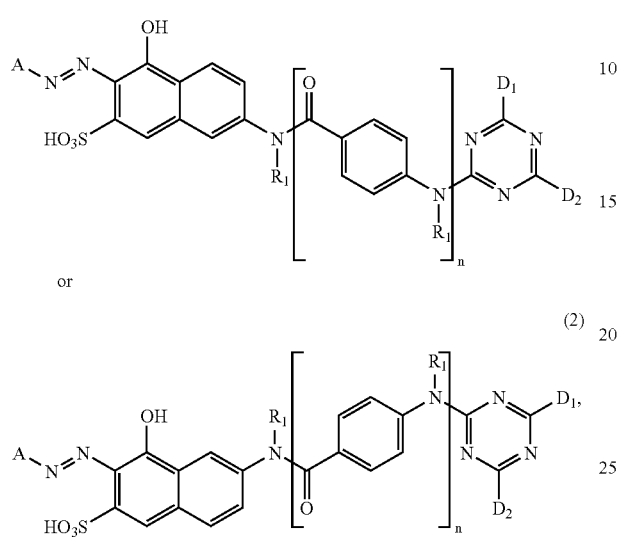

in which
A represents a benzene sulphonic acid residue which is unsubstituted or substituted by one single hydroxy, halogen, amino, nitro, $C_1$–$C_4$alkyl, $C_1$–$C_4$alkoxy, $C_2$–$C_4$hydroxyalkoxy, $COOC_1$–$C_4$alkyl or $NHCOC_1$–$C_4$alkyl group, a benzoic acid residue which is unsubstituted or substituted by one or more hydroxy, halogen, amino, nitro, $C_1$–$C_4$alkyl, $C_1$–$C_4$alkoxy, $C_2$–$C_4$hydroxyalkoxy, $COOC_1$–$C_4$alkyl or $NHCOC_1$–$C_4$alkyl groups, a naphthalene sulphonic acid residue which is unsubstituted or substituted by one or more hydroxy, halogen, amino, nitro, $C_1$–$C_4$alkyl, $C_1$–$C_4$alkoxy, $C_2$–$C_4$hydroxyalkoxy, $COOC_1$–$C_4$alkyl or $NHCOC_1$–$C_4$alkyl groups or a naphthoic acid residue which is unsubstituted or substituted by one or more hydroxy, halogen, amino, nitro, $C_1$–$C_4$alkyl, $C_1$–$C_4$alkoxy, $C_2$–$C_4$hydroxyalkoxy, $COOC_1$–$C_4$alkyl or $NHCOC_1$–$C_4$alkyl groups;

$D_1$ and $D_2$, independently represent
i) a residue of the formula

  (3), in which
B represents a $C_2$–$C_8$alkylene bridge which may be interrupted by a heteroatom, whereby $C_3$–$C_8$alkylene is branched or unbranched, a $C_2$–$C_6$alkylene bridge which is substituted by one or more hydroxy groups, a $C_1$–$C_6$alkylene-1,3- or -1,4-phenylene bridge or a 1,3- or -1,4-phenylene bridge;
$R_1$ represents hydrogen or $C_1$–$C_4$alkyl unsubstituted or mono-substituted by hydroxy, halogen, cyano or $C_1$–$C_4$alkoxy;
X is a group of the formula —$NR_2R_3$, wherein
$R_2$ and $R_3$, independently, represent hydrogen, $C_1$–$C_4$alkyl, $C_2$–$C_6$alkyl which is mono-substituted by hydroxy or by cyano, phenyl or $C_1$–$C_4$alkylphenyl, whereby the phenyl ring of the latter two groups is unsubstituted or substituted by up to three groups selected from hydroxy, halogen, $C_1$–$C_4$alkyl and $C_1$–$C_4$alkoxy or, alternatively,
$R_2$ and $R_3$, together with the nitrogen atom to which they are connected, complete a saturated, 5- or 6-membered ring which may contain, in addition to the nitrogen atom, one nitrogen or oxygen atom and which may be further substituted or, alternatively,
X is a group of the formula —$N^+R_4R_5R_6$, wherein
$R_4$, $R_5$ and $R_6$ each, independently, represent $C_1$–$C_4$alkyl, $C_2$–$C_6$alkyl which is mono-substitu by hydroxy or by cyano, phenyl or $C_1$–$C_4$alkylphenyl, whereby the phenyl ring of the latter two groups is unsubstituted or substituted by up to three groups selected from hydroxy, halogen, $C_1$–$C_4$alkyl and $C_1$–$C_4$alkoxy or,
ii) alternatively,
$D_1$ and $D_2$ independently represent a 5- or 6-membered, saturated heterocyclic ring connected by way of a nitrogen atom to the triazine ring and which ring may contain, in addition to the nitrogen atom, one further nitrogen or oxygen atom and which may be further substituted, whereby the nitrogen atom may be quaternised with a residue $R_4$,
$R_4$ being as previously defined, and
n is 0 or 1, the compound being in an internal or external salt form, or mixtures of compound (1) and (2).

The residues $D_1$ and $D_2$ are preferably identical.

Within the scope of the compound of formula (1), one preferred group of compounds are those in which n is 0, whilst those in which n represents 1 may also be preferred.

Furthermore, within the scope of the compound of formula (2), one preferred group of compounds are those in which n is 0, whilst those in which n represents 1 may also be preferred.

The residue A in the compounds of formula (1) and (2) may preferably represent a benzene sulphonic acid group which is unsubstituted or substituted by one single amino, nitro, halogen, hydroxy, $C_1$–$C_4$alkyl, $C_1$–$C_4$alkoxy or $NHCOC_1$–$C_4$alkyl group, a benzoic acid residue which is unsubstituted or substituted by one or more hydroxy, halogen, amino, nitro, $C_1$–$C_4$alkyl, $C_1$–$C_4$alkoxy or $NHCOC_1$–$C_4$alkyl groups, a naphthalene sulphonic acid residue or a naphthoic acid residue.

When A represents a naphthalene sulphonic acid residue, this is preferably a 1-naphthalene-2-, 3-, 4-, 6-, 7- or 8- or a 2-naphthalene-1-, 5-, 6- or 7-sulphonic acid residue which is not further substituted, whilst when A represents a benzene sulphonic acid group, this is preferably a benzene-2-, 3- or 4-sulphonic acid residue which is unsubstituted or substituted by one single amino, acetylamino, chloro, hydroxy, nitro, methyl or methoxy group, whilst when A represents a benzoic acid group, this is preferably a 2-, 3- or 4-benzoic acid residue which is unsubstituted or substituted by one or two acetylamino, hydroxy, chloro, amino, nitro, methyl or methoxy groups and when A represents a naphthoic acid residue, this is preferably a 2-substituted 1- or 3-naphthoic acid residue which is not further substituted.

When, in the compound of formula (1) or (2), $D_1$ and $D_2$ represent a group of the formula —$NR_1BX$   (3), the residue B preferably represents a $C_2$–$C_6$alkylene bridge which is unbranched or, in the case of $C_3$–$C_6$alkylene, branched, and which may be substituted by a hydroxy group and, especially, a $C_2$–$C_4$alkylene bridge which is unbranched or, in the case of $C_3$–$C_4$alkylene, branched, and may be substituted by a hydroxy group, $R_1$ represents hydrogen or $C_1$–$C_4$alkyl, in particular, methyl and X is a group of the formula $NR_2R_3$ or —$N^+R_4R_5R_6$, wherein $R_2$ and $R_3$, independently, represent hydrogen or $C_1$–$C_4$alkyl, in particular, methyl or ethyl and $R_4$, $R_5$ and $R_6$ each, independently, represent $C_1$–$C_4$alkyl, especially methyl or ethyl.

When, in the compound of formula (1) or (2) $D_1$ and $D_2$ represent a 5- or 6-membered, saturated heterocyclic ring, this is preferably an —N-pyrrolidino, —N-morpholino, —N-piperidno or —N-piperazino residue, whereby the piperazino ring may be further substituted by $C_1$–$C_4$alkyl, $C_1$–$C_4$aminoalkyl or $C_1$–$C_4$hydroxyalkyl on the nitrogen atom in the 4-position, as exemplified by a –1-substituted 4-methylpiperazino, 4-(2-aminoethyl)piperazino or a 4-(2-hydroxyethyl)piperazino residue. When the nitrogen atom of the ring is quaternised with a group $R_4$, this is preferably a $C_1$–$C_4$alkyl group, more preferably, methyl or ethyl, as exemplified by an N-methyl or N-ethyl piperidinium, pyrrolidinium or morpholinium residue. Alternatively, the nitrogen atom in the 4-position of the piperazine nucleus may be substituted by a $C_2$–$C_6$alkyl residue which, in turn, is further substituted by a quaternary ammonium group as, for example, a 1-substituted-4-(2-triethyl- or trimethyl)ethyl- or propylammonium piperazino residue.

An especially preferred embodiment of the invention is represented by the compound of formula (1) in which A represents a 1-naphthalene-6-sulphonic acid, a 2-naphthalene-6-sulphonic acid or a 2-naphthalene-7-sulphonic acid residue, B represents an n-propylene or an isopropylene residue, $R_1$ represents hydrogen, X is a diethylamino or an amino (—$NH_2$) residue and n is 0, the compound being in an internal or external salt form.

Within the scope of the definitions of the compounds of formulae (1) and (2), $C_1$–$C_4$alkyl groups may, for example, be methyl, ethyl, n-propyl, isopropyl, n-butyl, sec-butyl, isobutyl or tert-butyl, whilst $C_1$–$C_4$alkoxy groups may be exemplified by methoxy, ethoxy, n-propoxy, isopropoxy, n-butoxy, sec-butoxy, isobutoxy and tert-butoxy groups. Examples of $C_2$–$C_4$hydroxyalkoxy are 2-hydroxyethoxy, hydroxy-n- or isopropoxy and hydroxy-n-, sec-, iso- or tert-butoxy.

Haologen, in compounds of formulae (1) and (2) is iodine, bromine, fluorine or, especially, chlorine.

A $C_2$–$C_8$alkylene bridge in the definition of B may, for example be an ethylene, n-propylene, methyl ethylene, 1- or 2-methyl propylene, n-butylene, ethyl ethylene, n-pentylene, ethyl propylene, dimethyl propylene, methyl butylene, n-hexylene, dimethyl butylene, methyl pentylene, ethyl butylene, n-heptylene, methyl hexylene, dimethyl pentylene, ethyl pentylene, trimethyl butylene, n-octylene, methyl heptylene, dimethyl or ethyl hexylene or a trimethyl pentylene bridge, which may be interrupted by a heteroatom, preferably selected from nitrogen, oxygen or sulphur.

A $C_1$–$C_6$alkylene-1,3- or 1,4-phenylene bridge may be a 1,3- or 1,4-phenylenemethylene, phenyleneethylene, phenylenepropylene, phenylenebutylene, phenylenepentylene or phenylenehexylene residue.

Where, in the definitions of the substituents $R_2$, $R_3$, $R_4$, $R_5$ and/or $R_6$ as $C_2$–$C_6$alkyl which is mono-substituted by hydroxy or by cyano, these may be hydroxy- or cyanoethyl, hydroxy- or cyanopropyl, hydroxy- or cyanobutyl, hydroxy- or cyanopentyl or hydroxy- or cyanohexyl, whilst $C_1$–$C_4$alkylphenyl may be benzyl, phenethyl, propylphenyl or butylphenyl groups.

The dyes of the formulae (1) and (2) may be prepared by known methods, for example, by reacting the diazonium salt of an amine of the formula $$A\text{-}NH_2 \qquad (4)$$

with a compound of the formula

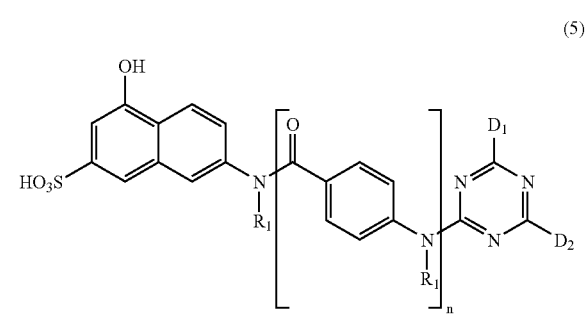

(5)

or

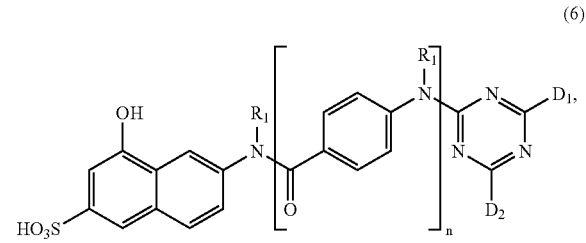

(6)

whereby

A, $R_1$, $D_1$, $D_2$ and n are as previously defined.

Such reactions for the preparation of azo-dyes are well documented in the chemical literature.

In certain cases in which the dyes of the formulae (1) and (2) contain free amino groups, it is advantageous to introduce a protective group which, after the coupling reaction, is then removed. Suitable protective groups are those which are readily cleaved, but are stable under the conditions of the azo-coupling reaction. Especially suitable groups are, for example, carboalkoxy groups, in particular, the carbomethoxy or carboethoxy groups or acyl groups such as propionyl or, in particular, acetyl groups.

The intermediate compounds of the formulae (5) and (6) are known compounds or may be prepared according to known methods, for example by stepwise reaction, in any desired sequence, of cyanuric chloride with an amine of the formula $$D_1H \quad (7)$$

and/or $$D_2H \quad (8)$$

and with a further amine of the formula (9)

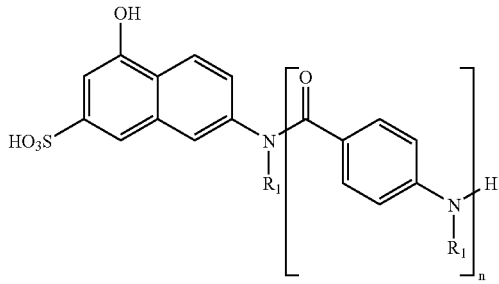

or (10)

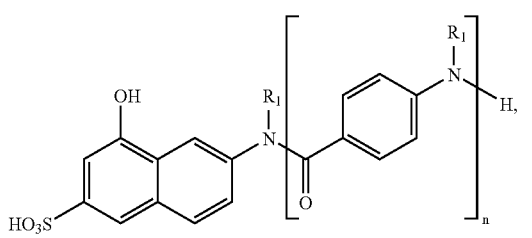

whereby
$R_1$, $D_1$, $D_2$ and n are as previously defined.

The dyes of the invention may be used to dye natural or synthetic materials, but are particularly useful for dyeing paper. They are preferably used as a solid or liquid commercial form.

The pulverulent or granular form of the dye is used particularly in batch-wise pulp dyeing where the dye mixture, customarily in the form of a stock solution, is added in the pulper, in the beater or in the mixing chest. Preference is here given to using dye preparations which as well as the dye, may further include extenders, for example urea as solubilizer, dextrin, Glauber salt, sodium chloride and also dispersants, dust-proofing agents and sequestrants, such as tetra-sodium phosphate.

The present invention accordingly further provides solid dye preparations for dyeing paper comprising a compound of the formula (1) and/or (2) and, optionally, further auxiliaries.

In recent years, the use of concentrated aqueous solutions of dyes has gained importance because of the advantages possessed by such solutions when compared with dyes in powder form. The use of solutions avoids the difficulties associated with dust formation and releases the user from the time-consuming and frequently difficult dissolving of the dye powder in water. The use of concentrated solutions was also prompted by the development of continuous dyeing processes for paper, since it is convenient in these processes to meter the solution directly into the pulp stream or to add it at some other suitable point of the paper-making process.

The present invention accordingly further provides aqueous solutions, preferably concentrated solutions, for dyeing paper, comprising a compound of the formula (1) and/or (2), preferably in a concentration of from 5 to 30% by weight. Due to their excellent solubility in water, the dyes of formula (1) and (2) are particularly suitable for the preparation of such solutions.

The concentrated solutions preferably contain a low level of inorganic salts, which may be achieved, if necessary, by known methods, for example reverse osmosis.

The solutions may include further auxiliaries, for example solubilizers such as ε-caprolactam or urea, organic solvents, for example glycols, polyethylene glycols, dimethyl sulphoxide, N-methylpyrrolidone, acetamide, alkanolamines or polyglycolamines, which is a still further aspect of the invention.

The novel dyes of the invention dye paper in predominantly red shades with a high degree of exhaustion under particular dyeing conditions. The resulting dyeings exhibit excellent fastness to water and to light.

Consequently, one further aspect of the invention is paper which is dyed with a compound of the formula (1) and/or (2), either in the form of a solid dye preparation, or an aqueous solution, as described above.

The following Examples serve to illustrate the invention without intending to be restrictive in nature. Parts and percentages are by weight unless otherwise stated.

EXAMPLE 1

(101)

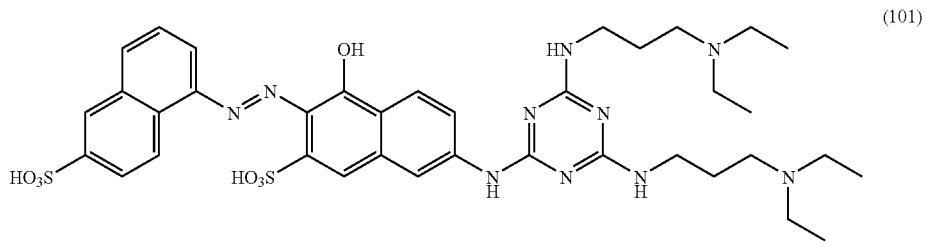

Step 1

184 g of cyanuric chloride are added to 250 g of water and 250 g of ice and the mixture stirred for 30 minutes. To the resulting white suspension, 260 g of N,N-diethylaminopropylamine are added with stirring over 3.5 hours, the temperature being maintained at 5° C. After the addition, the temperature is raised to 45–50° C., the mixture stirred for a further 1 hour and the pH then raised to 9.5–9.9 by the addition of approximately 180 ml of 30% aqueous sodium hydroxide. The resulting white precipitate is filtered with suction, washed with water and dried under vacuum at 50° C. to yield 276.6 g of 2,4-diamino-N,N'-bis-(3-diethylaminopropyl)-6–Chloro-1,3,5-triazine.

234 g of the 2,4-diamino-N,N'-bis-(3-diethylaminopropyl)-6–Chloro-1,3,5-triazine thus obtained are dissolved in 1025 ml of water and 124 ml of concentrated hydrochloric acid and 143.3 g of 6-amino-1-naphthol-3-sulphonic acid added. The mixture is then stirred for 1 hour at 85° C., the pH being maintained at 2.5 by the addition of 4N aqueous sodium hydroxide and then cooled to room temperature. There is obtained 1745 g of a clear brown solution containing 344 g of the compound of formula

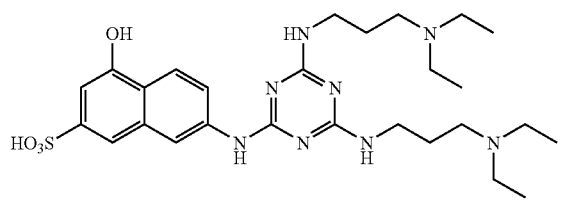

(100)

By replacement of the N,N-diethylaminopropylamine by equivalent quantities of the appropriate amines and proceeding in an analogous manner, the following intermediates of formula

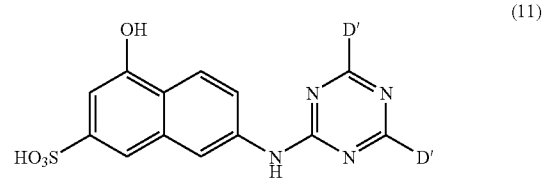

(11)

may be obtained, as summarized in Table 1.

TABLE 1

| Example Nr. | (100a) | (100b) | (100c) | (100d) | (100e) |
|---|---|---|---|---|---|
| D' | —NH—CH₂CH₂—NH₂ | —NH—CH₂CH₂CH₂—NH₂ | —NH—CH(CH₃)—CH₂—NH₂ | —N(CH₃)—CH₂CH₂CH₂—N(CH₃)— | —NH—CH₂CH₂—N(C₂H₅)₂ |

| Example Nr. | (100f) | (100g) | (100h) | (100i) | (100j) |
|---|---|---|---|---|---|
| D' | (structure) | (structure) | (structure) | (structure) | (piperazinyl) |

| Example Nr. | (100k) | (100l) |
|---|---|---|
| D' | piperazinyl-CH₂CH₂-OH | piperazinyl-CH₂CH₂-NH₂ |

Step 2

4.46 g of 1-naphthylamine-6-sulphonic acid are dissolved in 30 ml of water and approximately 0.5 ml of 50% aqueous sodium hydroxide and treated with 5 ml of concentrated hydrochloric acid. To the resulting fine suspension, 5 ml of a 4N aqueous sodium nitrite solution are then added slowly, the temperature being maintained at 5° C. After stirring for 30 minutes at this temperature, the excess nitrite is destroyed by the addition of a little sulphamic acid. The resulting diazonium salt suspension is then added dropwise at 10° C. to 87.2 g of the solution of compound (100) obtained in Step 1 above, the pH being maintained at 6.6 by addition of approximately 12 ml of 2N aqueous sodium hydroxide. After salting out, there are obtained 9.9 g of the compound of formula (101), which dyes paper with a high degree of exhaustion in red shades with excellent water fastness.

EXAMPLE 2

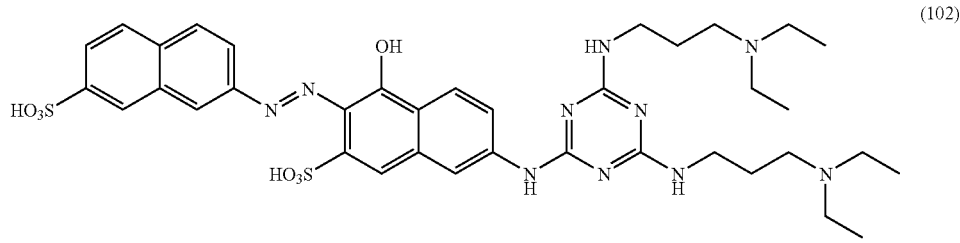
(102)

1.34 g of 2-naphthylamine-7-sulphonic acid are slurried in 100 ml of water and 3 g of 32% aqueous hydrochloric acid added. After cooling to 5° C., 1.5 ml of 4N aqueous sodium nitrite solution are slowly added at this temperature. Stirring is continued for a further 45 minutes and the excess nitrite then destroyed by addition of a small quantity of sulphamic acid. The orange suspension is then added to 23 g of the solution of compound (100), obtained as described in Step 1 of Example 1, to which a further 120 g of water and 2.5 ml of 2N aqueous sodium hydroxide solution had been added, the pH being maintained at 5.5 during the addition by simultaneous addition of a total of 8 ml of 2N aqueous sodium hydroxide solution. After salting out, 3.6 g of the compound of formula (102) are obtained which dyes paper with a high degree of exhaustion in brilliant scarlet shades with excellent water fastness.

If, in Step 1 of Example 1, after reaction of cyanuric chloride with N,N-diethylamino-propylamine, the 6-amino-1-naphthol-3-sulphonic acid is replaced by an equivalent quantity of 6-(4-aminobenzoyl)-amino-1-naphthol-3-sulphonic acid and proceeding in an analogous manner the intermediate of the formula

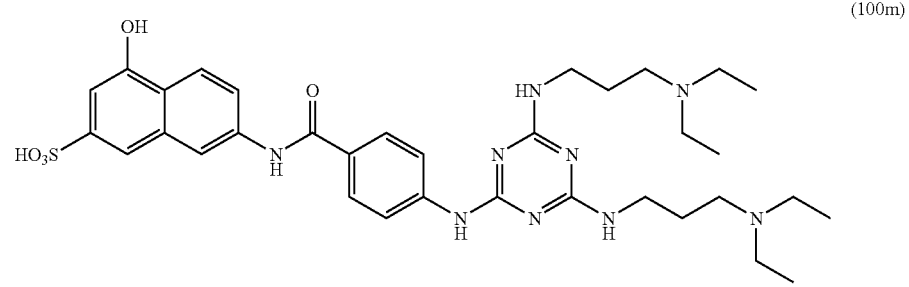
(100m)

may be obtained.

By replacement of the 1-naphthylamine-6-sulphonic acid in Step 2 of Example 1 or of the 2-naphthylamine-7-sulphonic acid in Example 2, by an aromatic amine of the formula A'NH$_2$, and proceeding in an analogous manner, either by reaction with the intermediate of formula (100) or (100m), the following dyes of the formula

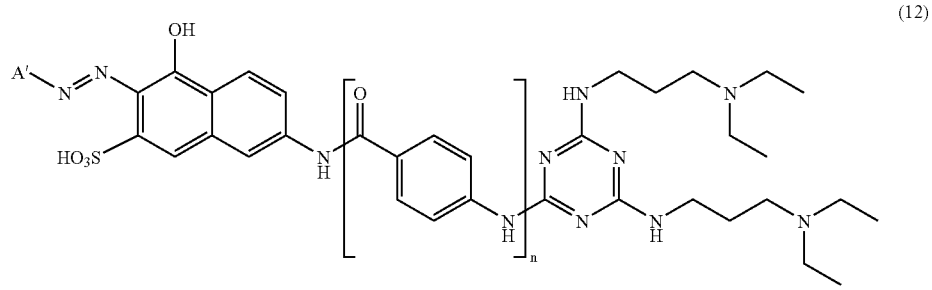
(12)

may be obtained, as summarized in Table 2 below.

TABLE 2

| Example Nr. | A' | n |
|---|---|---|
| (103) | 1-methyl-naphthalene-2-sulfonic acid | 0 |
| (104) | 1-methyl-naphthalene-2-sulfonic acid | 1 |
| (105) | 4-methyl-naphthalene-2-sulfonic acid | 0 |
| (106) | 4-methyl-naphthalene-2-sulfonic acid | 1 |
| (107) | 4-methyl-naphthalene-1-sulfonic acid | 0 |
| (108) | 4-methyl-naphthalene-1-sulfonic acid | 1 |
| (109) | 5-methyl-naphthalene-2-sulfonic acid | 0 |
| (110) | 5-methyl-naphthalene-2-sulfonic acid | 1 |
| (111) | 8-methyl-naphthalene-2-sulfonic acid | 0 |

TABLE 2-continued

| Example Nr. | A' | n |
|---|---|---|
| (112) | 8-methyl-naphthalene-2-sulfonic acid | 1 |
| (113) | 8-methyl-naphthalene-1-sulfonic acid | 0 |
| (114) | 8-methyl-naphthalene-1-sulfonic acid | 1 |
| (115) | 2-methyl-naphthalene-1-sulfonic acid | 0 |
| (116) | 2-methyl-naphthalene-1-sulfonic acid | 1 |
| (117) | 6-methyl-naphthalene-1-sulfonic acid | 0 |
| (118) | 6-methyl-naphthalene-1-sulfonic acid | 1 |
| (119) | 6-methyl-naphthalene-2-sulfonic acid | 0 |
| (120) | 6-methyl-naphthalene-2-sulfonic acid | 1 |
| (121) | 7-methyl-naphthalene-2-sulfonic acid | 0 |
| (122) | 7-methyl-naphthalene-2-sulfonic acid | 1 |

TABLE 2-continued

| Example Nr. | A' | n |
|---|---|---|
| (123) | 2-methyl-naphthalene-1-carboxylic acid | 0 |
| (124) | 2-methyl-naphthalene-1-carboxylic acid | 1 |
| (125) | 3-methyl-naphthalene-2-carboxylic acid | 0 |
| (126) | 3-methyl-naphthalene-2-carboxylic acid | 1 |
| (127) | 6-methyl-naphthalene-2-carboxylic acid | 0 |
| (128) | 6-methyl-naphthalene-2-carboxylic acid | 1 |
| (129) | 4-methylbenzenesulfonic acid | 0 |
| (130) | 4-methylbenzenesulfonic acid | 1 |
| (131) | 3,4-dimethylbenzenesulfonic acid | 0 |
| (132) | 3,4-dimethylbenzenesulfonic acid | 1 |
| (133) | 2,4-dimethylbenzenesulfonic acid | 0 |
| (134) | 2,4-dimethylbenzenesulfonic acid | 1 |
| (135) | 3-methoxy-4-methylbenzenesulfonic acid | 0 |
| (136) | 3-methoxy-4-methylbenzenesulfonic acid | 1 |
| (137) | 3-chloro-4-methylbenzenesulfonic acid | 0 |
| (138) | 3-chloro-4-methylbenzenesulfonic acid | 1 |
| (139) | 4-methyl-3-nitrobenzenesulfonic acid | 0 |
| (140) | 4-methyl-3-nitrobenzenesulfonic acid | 1 |
| (141) | 3-methylbenzenesulfonic acid | 0 |
| (142) | 3-methylbenzenesulfonic acid | 1 |
| (143) | 2,5-dimethylbenzenesulfonic acid | 0 |
| (144) | 2,5-dimethylbenzenesulfonic acid | 1 |

TABLE 2-continued

| Example Nr. | A' | n |
|---|---|---|
| (145) | 5-methyl-2-methoxybenzenesulfonic acid | 0 |
| (146) | 5-methyl-2-methoxybenzenesulfonic acid | 1 |
| (147) | 5-methyl-2-hydroxybenzenesulfonic acid | 0 |
| (148) | 5-methyl-2-hydroxybenzenesulfonic acid | 1 |
| (149) | 5-methyl-2-acetamidobenzenesulfonic acid | 0 |
| (150) | 5-methyl-2-acetamidobenzenesulfonic acid | 1 |
| (151) | 5-methyl-2-aminobenzenesulfonic acid | 0 |
| (152) | 5-methyl-2-aminobenzenesulfonic acid | 1 |
| (153) | 5-methyl-2-nitrobenzenesulfonic acid | 0 |
| (154) | 5-methyl-2-nitrobenzenesulfonic acid | 1 |
| (155) | 5-methyl-2-chlorobenzenesulfonic acid | 0 |
| (156) | 5-methyl-2-chlorobenzenesulfonic acid | 1 |
| (157) | 3,4-dimethylbenzenesulfonic acid | 0 |
| (158) | 3,4-dimethylbenzenesulfonic acid | 1 |
| (159) | 3-methyl-4-methoxybenzenesulfonic acid | 0 |
| (160) | 3-methyl-4-methoxybenzenesulfonic acid | 1 |
| (161) | 3-methyl-4-hydroxybenzenesulfonic acid | 0 |
| (162) | 3-methyl-4-hydroxybenzenesulfonic acid | 1 |
| (163) | 3-methyl-4-nitrobenzenesulfonic acid | 0 |

TABLE 2-continued

| Example Nr. | A' | n |
|---|---|---|
| (164) | 3-methyl-4-nitrobenzenesulfonic acid | 1 |
| (165) | 4-chloro-3-methylbenzenesulfonic acid | 0 |
| (166) | 4-chloro-3-methylbenzenesulfonic acid | 1 |
| (167) | 2,5-dimethylbenzenesulfonic acid (HO₃S, CH₃) | 0 |
| (168) | 2,5-dimethylbenzenesulfonic acid (HO₃S, CH₃) | 1 |
| (169) | 5-methoxy-2-methylbenzenesulfonic acid | 0 |
| (170) | 5-methoxy-2-methylbenzenesulfonic acid | 1 |
| (171) | 5-acetamido-2-methylbenzenesulfonic acid | 0 |
| (172) | 5-acetamido-2-methylbenzenesulfonic acid | 1 |
| (173) | 5-amino-2-methylbenzenesulfonic acid | 0 |
| (174) | 5-amino-2-methylbenzenesulfonic acid | 1 |
| (175) | 2-methyl-5-nitrobenzenesulfonic acid | 0 |
| (176) | 2-methyl-5-nitrobenzenesulfonic acid | 1 |
| (177) | 4-methylbenzoic acid | 0 |
| (178) | 4-methylbenzoic acid | 1 |
| (179) | 3,4-dimethylbenzoic acid | 0 |
| (180) | 3,4-dimethylbenzoic acid | 1 |
| (181) | 3-methoxy-4-methylbenzoic acid | 0 |
| (182) | 3-methoxy-4-methylbenzoic acid | 1 |
| (183) | 3-hydroxy-4-methylbenzoic acid | 0 |

TABLE 2-continued

| Example Nr. | A' | n |
|---|---|---|
| (184) | 4-methyl-3-hydroxybenzoic acid (CO₂H, HO) | 1 |
| (185) | 4-methyl-3-nitrobenzoic acid (CO₂H, O₂N) | 0 |
| (186) | 4-methyl-3-nitrobenzoic acid (CO₂H, O₂N) | 1 |
| (187) | 4-methyl-3-chlorobenzoic acid (CO₂H, Cl) | 0 |
| (188) | 4-methyl-3-chlorobenzoic acid (CO₂H, Cl) | 1 |
| (189) | 4-methyl-2-methoxybenzoic acid (CO₂H, O—CH₃) | 0 |
| (190) | 4-methyl-2-methoxybenzoic acid (CO₂H, O—CH₃) | 1 |
| (191) | 4-methyl-2-hydroxybenzoic acid (CO₂H, OH) | 0 |
| (192) | 4-methyl-2-hydroxybenzoic acid (CO₂H, OH) | 1 |
| (193) | 4-methyl-2-nitrobenzoic acid (CO₂H, NO₂) | 0 |

TABLE 2-continued

| Example Nr. | A' | n |
|---|---|---|
| (194) | 4-methyl-2-nitrobenzoic acid (CO₂H, NO₂) | 1 |
| (195) | 4-methyl-2-aminobenzoic acid (CO₂H, NH₂) | 0 |
| (196) | 4-methyl-2-aminobenzoic acid (CO₂H, NH₂) | 1 |
| (197) | 4-methyl-2-chlorobenzoic acid (CO₂H, Cl) | 0 |
| (198) | 4-methyl-2-chlorobenzoic acid (CO₂H, Cl) | 1 |
| (199) | 3-methylbenzoic acid (CO₂H) | 0 |
| (200) | 3-methylbenzoic acid (CO₂H) | 1 |
| (201) | 3,4-dimethylbenzoic acid (CO₂H, H₃C) | 0 |
| (202) | 3,4-dimethylbenzoic acid (CO₂H, H₃C) | 1 |
| (203) | 3-methyl-4-methoxybenzoic acid (CO₂H, H₃C—O) | 0 |

TABLE 2-continued

| Example Nr. | A' | n |
|---|---|---|
| (204) | 3-methyl-4-methoxybenzoic acid | 1 |
| (205) | 3-methyl-4-hydroxybenzoic acid | 0 |
| (206) | 3-methyl-4-hydroxybenzoic acid | 1 |
| (207) | 3-methyl-4-acetamidobenzoic acid | 0 |
| (208) | 3-methyl-4-acetamidobenzoic acid | 1 |
| (209) | 3-methyl-4-aminobenzoic acid | 0 |
| (210) | 3-methyl-4-aminobenzoic acid | 1 |
| (211) | 3-methyl-4-chlorobenzoic acid | 0 |
| (212) | 3-methyl-4-chlorobenzoic acid | 1 |
| (213) | 5-methyl-2-hydroxybenzoic acid | 0 |
| (214) | 5-methyl-2-hydroxybenzoic acid | 1 |
| (215) | 5-methyl-2-aminobenzoic acid | 0 |
| (216) | 5-methyl-2-aminobenzoic acid | 1 |
| (217) | 5-methyl-2-nitrobenzoic acid | 0 |
| (218) | 5-methyl-2-nitrobenzoic acid | 1 |
| (219) | 5-methyl-2-chlorobenzoic acid | 0 |
| (220) | 5-methyl-2-chlorobenzoic acid | 1 |
| (221) | 3-methyl-5-acetamidobenzoic acid | 0 |

TABLE 2-continued

| Example Nr. | A' | n |
|---|---|---|
| (222) | 3-methyl-5-(NHCOCH$_3$)-benzoic acid (CO$_2$H, CH$_3$, NHCOCH$_3$ substituents) | 1 |
| (223) | 3-methyl-5-amino-benzoic acid | 0 |
| (224) | 3-methyl-5-amino-benzoic acid | 1 |
| (225) | 3-methyl-5-nitro-benzoic acid | 0 |
| (226) | 3-methyl-5-nitro-benzoic acid | 1 |
| (227) | 2-hydroxy-3-methyl-benzoic acid | 0 |
| (228) | 2-hydroxy-3-methyl-benzoic acid | 1 |
| (229) | 2-methyl-3-methyl-benzoic acid | 0 |
| (230) | 2-methyl-3-methyl-benzoic acid | 1 |
| (231) | 2-chloro-3-methyl-benzoic acid | 0 |
| (232) | 2-chloro-3-methyl-benzoic acid | 1 |
| (233) | 2-methyl-benzoic acid | 0 |
| (234) | 2-methyl-benzoic acid | 1 |
| (235) | 2-methyl-5-methyl-benzoic acid | 0 |
| (236) | 2-methyl-5-methyl-benzoic acid | 1 |
| (237) | 2-methyl-5-methoxy-benzoic acid | 0 |
| (238) | 2-methyl-5-methoxy-benzoic acid | 1 |
| (239) | 2-methyl-5-hydroxy-benzoic acid | 0 |
| (240) | 2-methyl-5-hydroxy-benzoic acid | 1 |
| (241) | 2-methyl-5-(NHCOCH$_3$)-benzoic acid | 0 |

TABLE 2-continued

| Example Nr. | A' | n |
|---|---|---|
| (242) | 3-(NHCOCH₃)-2-methyl-benzoic acid (HO₂C, CH₃, NHCOCH₃ on benzene) | 1 |
| (243) | 5-amino-2-methyl-benzoic acid | 0 |
| (244) | 5-amino-2-methyl-benzoic acid | 1 |
| (245) | 2-methyl-5-nitro-benzoic acid | 0 |
| (246) | 2-methyl-5-nitro-benzoic acid | 1 |
| (247) | 5-chloro-2-methyl-benzoic acid | 0 |
| (248) | 5-chloro-2-methyl-benzoic acid | 1 |
| (249) | 2,3-dimethyl-benzoic acid | 0 |
| (250) | 2,3-dimethyl-benzoic acid | 1 |
| (251) | 3-methoxy-2-methyl-benzoic acid | 0 |
| (252) | 3-methoxy-2-methyl-benzoic acid | 1 |
| (253) | 3-hydroxy-2-methyl-benzoic acid | 0 |
| (254) | 3-hydroxy-2-methyl-benzoic acid | 1 |
| (255) | 2-methyl-3-nitro-benzoic acid | 0 |
| (256) | 2-methyl-3-nitro-benzoic acid | 1 |
| (257) | 3-chloro-2-methyl-benzoic acid | 0 |
| (258) | 3-chloro-2-methyl-benzoic acid | 1 |
| (259) | 2,6-dimethyl-benzoic acid | 0 |
| (260) | 2,6-dimethyl-benzoic acid | 1 |

TABLE 2-continued

| Example Nr. | A' | n |
|---|---|---|
| (261) | 2-methyl-6-methoxy-benzoic acid | 0 |
| (262) | 2-methyl-6-methoxy-benzoic acid | 1 |
| (263) | 2,3-dimethyl-5-methyl-benzoic acid (HO₂C, with CH₃ groups) | 0 |
| (264) | 2,3-dimethyl-5-methyl-benzoic acid | 1 |
| (265) | 2,3,6-trimethyl-benzoic acid | 0 |
| (266) | 2,3,6-trimethyl-benzoic acid | 1 |
| (267) | 2-methyl-4,5-dimethoxy-benzoic acid | 0 |
| (268) | 2-methyl-4,5-dimethoxy-benzoic acid | 1 |

TABLE 2-continued

| Example Nr. | A' | n |
|---|---|---|
| (269) | 2-methyl-3,4-dimethoxy-benzoic acid | 0 |
| (270) | 2-methyl-3,4-dimethoxy-benzoic acid | 1 |
| (271) | 2-methyl-3,5-dichloro-benzoic acid | 0 |
| (272) | 2-methyl-3,5-dichloro-benzoic acid | 1 |
| (273) | 2-methyl-3,6-dichloro-benzoic acid | 0 |
| (274) | 2-methyl-3,6-dichloro-benzoic acid | 1 |

If, in Step 1 of Example 1, after reaction of cyanuric chloride with N,N-diethylamino-propylamine, the 6-amino-1-naphthol-3-sulphonic acid is replaced by an equivalent quantity either of 7-amino-1-naphthol-3-sulphonic acid or of 7-(4-aminobenzoyl)-amino-1-naphthol-3-sulphonic acid and proceeding in an analogous manner, the corresponding intermediates of the formulae

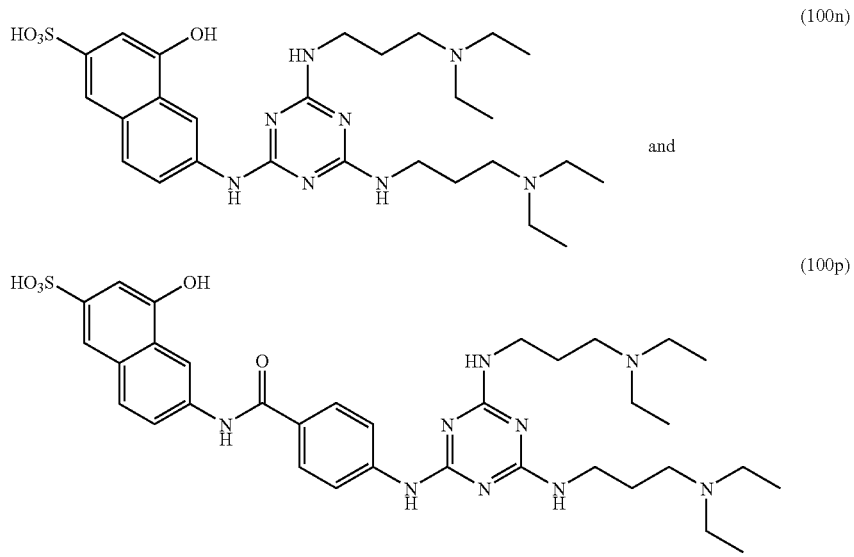

may be obtained.

By replacement of the 1-naphthylamine-6-sulphonic acid in Step 2 of Example 1 or of the 2-naphthylamine-7-sulphonic acid in Example 2, by an aromatic amine of the formula A″NH$_2$, and proceeding in an analogous manner, either by reaction with the intermediate of formula (100n) or (100p), the following dyes of the formula

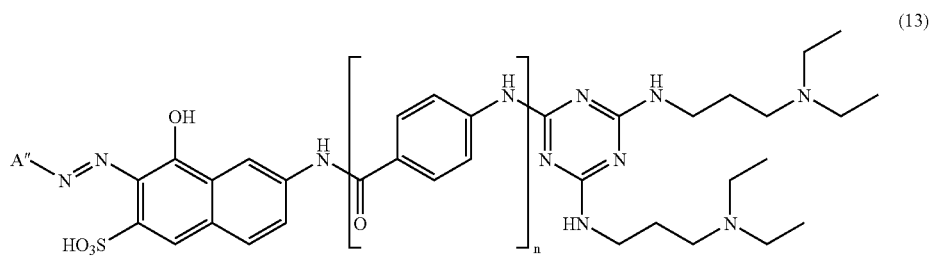

may be obtained, as summarized in Table 3 below.

TABLE 3

| Example Nr. | A″ | n |
|---|---|---|
| (275) | ![1-methyl-naphthalene-2-sulphonic acid] | 0 |
| (276) | ![1-methyl-naphthalene-2-sulphonic acid] | 1 |

TABLE 3-continued

| Example Nr. | A″ | n |
|---|---|---|
| (277) | ![4-methyl-naphthalene-2-sulphonic acid] | 0 |
| (278) | ![4-methyl-naphthalene-2-sulphonic acid] | 1 |

TABLE 3-continued

| Example Nr. | A'' | n |
|---|---|---|
| (279) | 4-methyl-naphthalene-1-sulfonic acid | 0 |
| (280) | 4-methyl-naphthalene-1-sulfonic acid | 1 |
| (281) | 5-methyl-naphthalene-2-sulfonic acid | 0 |
| (282) | 5-methyl-naphthalene-2-sulfonic acid | 1 |
| (283) | 8-methyl-naphthalene-2-sulfonic acid (HO₃S at 2, methyl at 8) | 0 |
| (284) | 8-methyl-naphthalene-2-sulfonic acid | 1 |
| (285) | 8-methyl-naphthalene-1-sulfonic acid | 0 |
| (286) | 8-methyl-naphthalene-1-sulfonic acid | 1 |
| (287) | 2-methyl-naphthalene-1-sulfonic acid | 0 |

TABLE 3-continued

| Example Nr. | A'' | n |
|---|---|---|
| (288) | 2-methyl-naphthalene-1-sulfonic acid | 1 |
| (289) | 6-methyl-naphthalene-1-sulfonic acid | 0 |
| (290) | 6-methyl-naphthalene-1-sulfonic acid | 1 |
| (291) | 6-methyl-naphthalene-2-sulfonic acid | 0 |
| (292) | 6-methyl-naphthalene-2-sulfonic acid | 1 |
| (293) | 7-methyl-naphthalene-2-sulfonic acid | 0 |
| (294) | 7-methyl-naphthalene-2-sulfonic acid | 1 |
| (295) | 2-methyl-naphthalene-1-carboxylic acid | 0 |
| (296) | 2-methyl-naphthalene-1-carboxylic acid | 1 |
| (297) | 3-methyl-naphthalene-2-carboxylic acid | 0 |
| (298) | 3-methyl-naphthalene-2-carboxylic acid | 1 |

TABLE 3-continued
| Example Nr. | A″ | n |
|---|---|---|
| (299) | 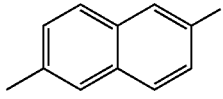 | 0 |
| (300) | 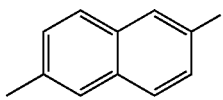 | 1 |
| (301) | 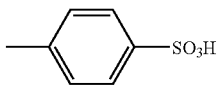 | 0 |
| (302) | 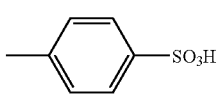 | 1 |
| (303) | 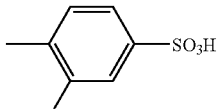 | 0 |
| (304) | 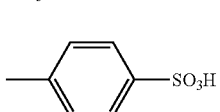 | 1 |
| (305) |  | 0 |
| (306) | 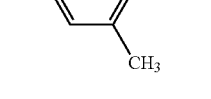 | 1 |
| (307) | 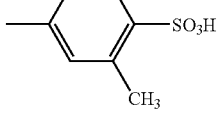 | 0 |
| (308) | 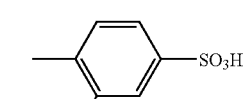 | 1 |
| (309) | 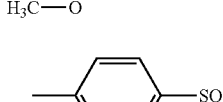 | 0 |
| (310) | 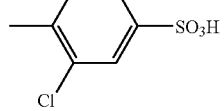 | 1 |
| (311) | 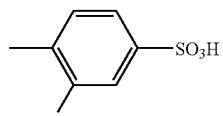 | 0 |
| (312) | 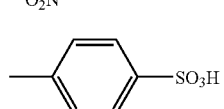 | 1 |
| (313) | 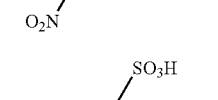 | 0 |
| (314) | 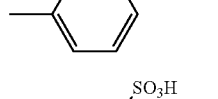 | 1 |
| (315) | 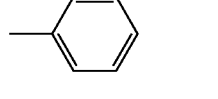 | 0 |
| (316) | 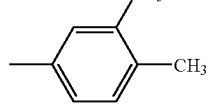 | 1 |
| (317) | 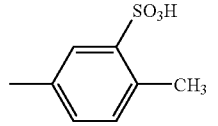 | 0 |
| (318) | 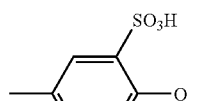 | 1 |
| (319) | 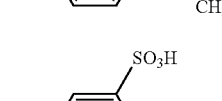 | 0 |
| (320) | 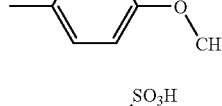 | 1 |

TABLE 3-continued

| Example Nr. | A'' | n |
|---|---|---|
| (321) | 4-methyl-2-SO3H-phenyl with NHCOCH3 | 0 |
| (322) | 4-methyl-2-SO3H-phenyl with NHCOCH3 | 1 |
| (323) | 4-methyl-2-SO3H-phenyl with NH2 | 0 |
| (324) | 4-methyl-2-SO3H-phenyl with NH2 | 1 |
| (325) | 4-methyl-2-SO3H-phenyl with NO2 | 0 |
| (326) | 4-methyl-2-SO3H-phenyl with NO2 | 1 |
| (327) | 4-methyl-2-SO3H-phenyl with Cl | 0 |
| (328) | 4-methyl-2-SO3H-phenyl with Cl | 1 |
| (329) | 3-methyl-4-CH3-phenyl with SO3H | 0 |
| (330) | 3-methyl-4-CH3-phenyl with SO3H | 1 |
| (331) | 3-methyl-4-OCH3-phenyl with SO3H | 0 |
| (332) | 3-methyl-4-OCH3-phenyl with SO3H | 1 |
| (333) | 3-methyl-4-OH-phenyl with SO3H | 0 |
| (334) | 3-methyl-4-OH-phenyl with SO3H | 1 |
| (335) | 3-methyl-4-NO2-phenyl with SO3H | 0 |
| (336) | 3-methyl-4-NO2-phenyl with SO3H | 1 |
| (337) | 3-methyl-4-Cl-phenyl with SO3H | 0 |
| (338) | 3-methyl-4-Cl-phenyl with SO3H | 1 |

TABLE 3-continued

| Example Nr. | A'' | n |
|---|---|---|
| (339) | 2-methyl-5-methyl-benzenesulfonic acid (HO₃S, CH₃) | 0 |
| (340) | 2-methyl-5-methyl-benzenesulfonic acid (HO₃S, CH₃) | 1 |
| (341) | 2-methyl-4-methoxy-benzenesulfonic acid (HO₃S, OCH₃) | 0 |
| (342) | 2-methyl-4-methoxy-benzenesulfonic acid (HO₃S, OCH₃) | 1 |
| (343) | 2-methyl-4-acetamido-benzenesulfonic acid (HO₃S, NHCOCH₃) | 0 |
| (344) | 2-methyl-4-acetamido-benzenesulfonic acid (HO₃S, NHCOCH₃) | 1 |
| (345) | 2-methyl-4-amino-benzenesulfonic acid (HO₃S, NH₂) | 0 |
| (346) | 2-methyl-4-amino-benzenesulfonic acid (HO₃S, NH₂) | 1 |
| (347) | 2-methyl-4-nitro-benzenesulfonic acid (HO₃S, NO₂) | 0 |
| (348) | 2-methyl-4-nitro-benzenesulfonic acid (HO₃S, NO₂) | 1 |
| (349) | 4-methylbenzoic acid (CO₂H) | 0 |
| (350) | 4-methylbenzoic acid (CO₂H) | 1 |
| (351) | 3-methyl-4-methyl-benzoic acid (CO₂H, H₃C) | 0 |
| (352) | 3-methyl-4-methyl-benzoic acid (CO₂H, H₃C) | 1 |
| (353) | 3-methoxy-4-methyl-benzoic acid (CO₂H, H₃CO) | 0 |
| (354) | 3-methoxy-4-methyl-benzoic acid (CO₂H, H₃CO) | 1 |
| (355) | 3-hydroxy-4-methyl-benzoic acid (CO₂H, HO) | 0 |
| (356) | 3-hydroxy-4-methyl-benzoic acid (CO₂H, HO) | 1 |
| (357) | 3-nitro-4-methyl-benzoic acid (CO₂H, O₂N) | 0 |
| (358) | 3-nitro-4-methyl-benzoic acid (CO₂H, O₂N) | 1 |
| (359) | 3-chloro-4-methyl-benzoic acid (CO₂H, Cl) | 0 |
| (360) | 3-chloro-4-methyl-benzoic acid (CO₂H, Cl) | 1 |

TABLE 3-continued

| Example Nr. | A'' | n |
|---|---|---|
| (361) | 4-methyl-2-methoxy-benzoic acid | 0 |
| (362) | 4-methyl-2-methoxy-benzoic acid | 1 |
| (363) | 4-methyl-2-hydroxy-benzoic acid | 0 |
| (364) | 4-methyl-2-hydroxy-benzoic acid | 1 |
| (365) | 4-methyl-2-nitro-benzoic acid | 0 |
| (366) | 4-methyl-2-nitro-benzoic acid | 1 |
| (367) | 4-methyl-2-amino-benzoic acid | 0 |
| (368) | 4-methyl-2-amino-benzoic acid | 1 |
| (369) | 4-methyl-2-chloro-benzoic acid | 0 |
| (370) | 4-methyl-2-chloro-benzoic acid | 1 |
| (371) | 3-methyl-benzoic acid | 0 |
| (372) | 3-methyl-benzoic acid | 1 |
| (373) | 3-methyl-4-methyl-benzoic acid | 0 |
| (374) | 3-methyl-4-methyl-benzoic acid | 1 |
| (375) | 3-methyl-4-methoxy-benzoic acid | 0 |
| (376) | 3-methyl-4-methoxy-benzoic acid | 1 |
| (377) | 3-methyl-4-hydroxy-benzoic acid | 0 |
| (378) | 3-methyl-4-hydroxy-benzoic acid | 1 |
| (379) | 3-methyl-4-acetamido-benzoic acid | 0 |

TABLE 3-continued

| Example Nr. | A'' | n |
|---|---|---|
| (380) | 3-methyl-4-(acetylamino)benzoic acid | 1 |
| (381) | 3-methyl-4-aminobenzoic acid | 0 |
| (382) | 3-methyl-4-aminobenzoic acid | 1 |
| (383) | 3-methyl-4-chlorobenzoic acid | 0 |
| (384) | 3-methyl-4-chlorobenzoic acid | 1 |
| (385) | 5-methyl-2-hydroxybenzoic acid | 0 |
| (386) | 5-methyl-2-hydroxybenzoic acid | 1 |
| (387) | 5-methyl-2-aminobenzoic acid | 0 |
| (388) | 5-methyl-2-aminobenzoic acid | 1 |
| (389) | 5-methyl-2-nitrobenzoic acid | 0 |
| (390) | 5-methyl-2-nitrobenzoic acid | 1 |
| (391) | 5-methyl-2-chlorobenzoic acid | 0 |
| (392) | 5-methyl-2-chlorobenzoic acid | 1 |
| (393) | 5-methyl-3-(acetylamino)benzoic acid | 0 |
| (394) | 5-methyl-3-(acetylamino)benzoic acid | 1 |
| (395) | 5-methyl-3-aminobenzoic acid | 0 |
| (396) | 5-methyl-3-aminobenzoic acid | 1 |
| (397) | 5-methyl-3-nitrobenzoic acid | 0 |

TABLE 3-continued

| Example Nr. | A″ | n |
|---|---|---|
| (398) | 3-methyl-5-nitrobenzoic acid | 1 |
| (399) | 2-hydroxy-3-methylbenzoic acid | 0 |
| (400) | 2-hydroxy-3-methylbenzoic acid | 1 |
| (401) | 2,3-dimethylbenzoic acid | 0 |
| (402) | 2,3-dimethylbenzoic acid | 1 |
| (403) | 2-chloro-3-methylbenzoic acid | 0 |
| (404) | 2-chloro-3-methylbenzoic acid | 1 |
| (405) | 3-methylbenzoic acid | 0 |
| (406) | 3-methylbenzoic acid | 1 |
| (407) | 3,5-dimethylbenzoic acid | 0 |
| (408) | 2,5-dimethylbenzoic acid | 1 |
| (409) | 2-methyl-4-methoxybenzoic acid | 0 |
| (410) | 2-methyl-4-methoxybenzoic acid | 1 |
| (411) | 2-methyl-4-hydroxybenzoic acid | 0 |
| (412) | 2-methyl-4-hydroxybenzoic acid | 1 |
| (413) | 2-methyl-4-(acetylamino)benzoic acid | 0 |
| (414) | 2-methyl-4-(acetylamino)benzoic acid | 1 |
| (415) | 2-methyl-4-aminobenzoic acid | 0 |
| (416) | 2-methyl-4-aminobenzoic acid | 1 |
| (417) | 2-methyl-4-nitrobenzoic acid | 0 |
| (418) | 2-methyl-4-nitrobenzoic acid | 1 |

TABLE 3-continued

| Example Nr. | A″ | n |
|---|---|---|
| (419) | 2-methyl-5-chloro-benzoic acid | 0 |
| (420) | 2-methyl-5-chloro-benzoic acid | 1 |
| (421) | 2,3-dimethyl-benzoic acid | 0 |
| (422) | 2,3-dimethyl-benzoic acid | 1 |
| (423) | 2-methyl-3-methoxy-benzoic acid | 0 |
| (424) | 2-methyl-3-methoxy-benzoic acid | 1 |
| (425) | 2-methyl-3-hydroxy-benzoic acid | 0 |
| (426) | 2-methyl-3-hydroxy-benzoic acid | 1 |
| (427) | 2-methyl-3-nitro-benzoic acid | 0 |
| (428) | 2-methyl-3-nitro-benzoic acid | 1 |
| (429) | 2-methyl-3-chloro-benzoic acid | 0 |
| (430) | 2-methyl-3-chloro-benzoic acid | 1 |
| (431) | 2,6-dimethyl-benzoic acid | 0 |
| (432) | 2,6-dimethyl-benzoic acid | 1 |
| (433) | 2-methyl-6-methoxy-benzoic acid | 0 |
| (434) | 2-methyl-6-methoxy-benzoic acid | 1 |
| (435) | 2,3,5-trimethyl-benzoic acid | 0 |

TABLE 3-continued

| Example Nr. | A'' | n |
|---|---|---|
| (436) | 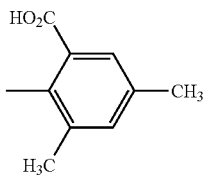 | 1 |
| (437) | 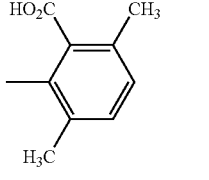 | 0 |
| (438) | 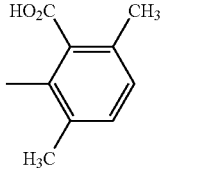 | 1 |
| (439) | 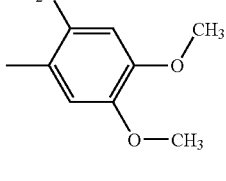 | 0 |
| (440) | 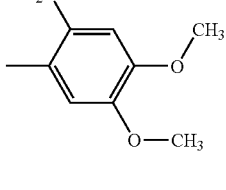 | 1 |
| (441) | 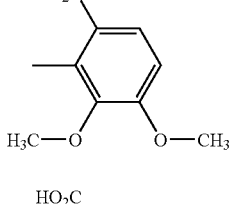 | 0 |
| (442) | 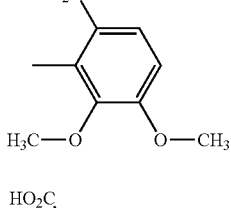 | 1 |
| (443) | 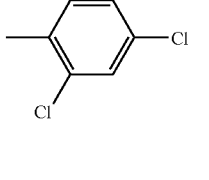 | 0 |
| (444) | 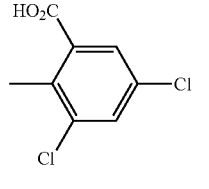 | 1 |
| (445) | 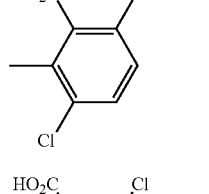 | 0 |
| (446) | 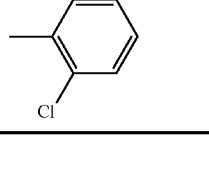 | 1 |

The invention claimed is:

1. A compound of the formula

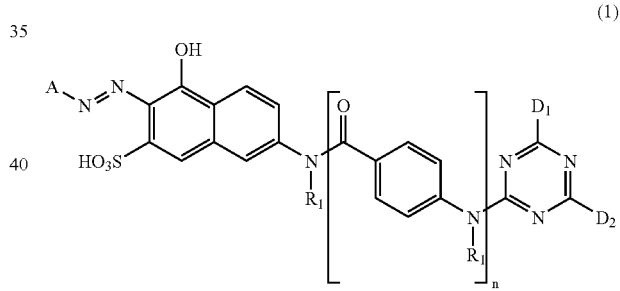

(1)

or

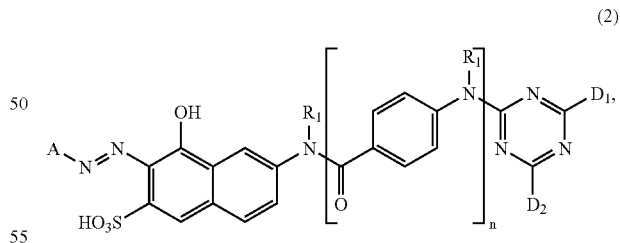

(2)

in which

A represents a benzoic acid residue which is unsubstituted or substituted by one or more hydroxy, halogen, amino, nitro, $C_1$–$C_4$alkyl, $C_1$–$C_4$alkoxy, $C_2$–$C_4$hydroxyalkoxy, $COOC_1$–$C_4$alkyl or $NHCOC_1$–$C_4$alkyl groups, a naphthalene sulphonic acid residue which is unsubstituted or substituted by one or more hydroxy, halogen, amino, nitro, $C_1$–$C_4$alkyl, $C_1$–$C_4$alkoxy, $C_2$–$C_4$hydroxyalkoxy, $COOC_1$–$C_4$alkyl or $NHCOC_1$–$C_4$alkyl groups or a naphthoic acid residue which is unsubstituted or sub stituted by one or more hydroxy, halogen, amino, nitro, $C_1$–$C_4$alkyl, $C_1$–$C_4$alkoxy, $C_2$–$C_4$hydroxyalkoxy, COOC$_1$–C$_4$alkyl or NHCOC$_1$–C$_4$alkyl groups;

$D_1$ and $D_2$, independently represent
i) a residue of the formula

—NR$_1$BX  (3), in which
B represents a $C_2$–$C_8$alkylene bridge which may be interrupted by a heteroatom, whereby $C_3$–$C_8$alkylene is branched or unbranched, a $C_2$–$C_6$alkylene bridge which is substituted by one or more hydroxy groups, a $C_1$–$C_8$alkylene-1,3- or -1,4-phenylene bridge or a 1,3- or -1,4-phenylene bridge;

$R_1$ represents hydrogen or $C_1$–$C_4$alkyl unsubstituted or mono-substituted by hydroxy, haiogen, cyano or $C_1$–$C_4$alkoxy;

X is a group of the formula —NR$_2$R$_3$, wherein
$R_2$ and $R_3$, independently, represent hydrogen, $C_1$–$C_4$alkyl, $C_2$–$C_6$alkyl which is mono-substituted by hydroxy or by cyano, phenyl or $C_1$–$C_4$alkylphenyl, whereby the phenyl ring of the latter two groups is unsubstituted or substituted by up to three groups selected from hydroxy, halogen, $C_1$–$C_4$alkyl and $C_1$–$C_4$alkoxy or, alternatively, $R_2$ and $R_3$, together with the nitrogen atom to which they are connected, complete a saturated, 5- or 6-membered ring which may contain, in addition to the nitrogen atom, one nitrogen or oxygen atom and which may be further substituted or, alternatively, X is a group of the formula —N$^+$R$_4$R$_5$R$_6$, wherein
$R_4$, $R_5$ and $R_6$ each, independently, represent $C_1$–$C_4$alkyl, $C_2$–$C_6$alkyl which is mono-substituted by hydroxy or by cyano, phenyl or $C_1$–$C_4$alkylphenyl, whereby the phenyl ring of the latter two groups is unsubstituted or substituted by up to three groups selected from hydroxy, halogen, $C_1$–$C_4$alkyl and $C_1$–$C_4$alkoxy or,
ii) alternatively, $D_1$ and $D_2$, independently represent a $_5$- or 6-membered, saturated heterocyclic ring connected by way of a nitrogen atom to the triazine ring and which ring may contain, in addition to the nitrogen atom, one further nitrogen or oxygen atom and which may be further substituted, whereby the nitrogen atom may be quaternised with a residue $R_4$ or be substituted with a $C_2$–$C_6$alkyltrialkyl-ammonium residue, $R_4$ being as previously defined, and
n is 0 or 1,
the compound being in an internal or external salt form, or mixtures of compound (1) and (2).

2. A compound according to claim 1 in which $D_1$ and $D_2$ are identical.

3. A compound according to claim 1 in which
A represents a benzoic acid residue which is unsubstituted or substituted by one or more hydroxy, halogen, amino, nitro, $C_1$–$C_4$alkyl, $C_1$–$C_4$alkoxy or NHCOC$_1$–C$_4$alkyl groups, a naphthalene sulphonic acid residue or a naphthoic acid residue.

4. A compound according to claim 3 in which
A represents a 1-naphthalene-2-, 3-, 4-, 6-, 7- or 8- or a 2-naphthalene-1-, 5-, 6-, 7-sulphonic acid residue.

5. A compound according to claim 3 in which
A represents a 2-, 3- or 4-benzoic acid residue which is unsubstituted or substituted by one or two acetylamino, hydroxy, chloro, amino, nitro, methyl or methoxy groups.

6. A compound according to claim 3 in which
A represents a 2-substituted 1- or 3-naphthoic acid residue.

7. A compound according to claim 1 in which
B represents a $C_2$–$C_6$alkylene bridge which is unbranched or, in the case of $C_3$–$C_6$alkylene, branched, and which may be substituted by a hydroxy group,
$R_1$ represents hydrogen or $C_1$–$C_4$alkyl and
X is a group of the formula NR$_2$R$_3$ or —N$^+$R$_4$R$_5$R$_6$, wherein
$R_2$ and $R_3$, independently, represent hydrogen or $C_1$–$C_4$alkyl and
$R_4$, $R_5$ and $R_6$ each, independently, represent $C_1$–$C_4$alkyl.

8. A compound according to claim 7 in which
B represents a $C_2$–$C_4$alkylene bridge which is unbranched or, in the case of $C_3$–$C_4$alkylene, branched, and may be substituted by a hydroxy group,
$R_1$ represents hydrogen or methyl and
X is a group of the formula NR$_2$R$_3$ or —N$^+$R$_4$R$_5$R$_6$, wherein
$R_2$ and $R_3$ both represent hydrogen, methyl or ethyl and
$R_4$, $R_5$ and $R_6$ each represent methyl or ethyl.

9. A compound according to claim 1 in which
$D_1$ and $D_2$ represent an —N-pyrrolidino, —N-morpholino, —N-piperidno or —N-piperazino residue, whereby the piperazino ring may be further substituted by $C_1$–$C_4$alkyl, $C_1$–$C_4$aminoalkyl or $C_1$–$C_4$hydroxyalkyl on the nitrogen atom in the 4-position.

10. A compound of formula (1), according to claim 1, in which
A represents a 1-naphthalene-6-sulphonic acid, a 2-naphthalene-6-sulphonic acid or a 2-naphthalene-7-sulphonic acid residue,
B represents an n-propylene or an isopropylene residue,
$R_1$ represents hydrogen,
X is a diethylamino or an amino residue and
n is 0,
the compound being in an internal or external salt form.

11. A process for the preparation of the compound of formula (1) or of formula (2), according to claim 1, comprising reacting the diazonium salt of an amine of the formula

A-NH$_2$  (4)

with a compound of the formula (5)

[structure: naphthalene with OH, HO$_3$S substituents, linked via N(R$_1$)—C(=O)—phenyl—N(R$_1$)$_n$— to a triazine ring with $D_1$ and $D_2$ substituents]

or

-continued

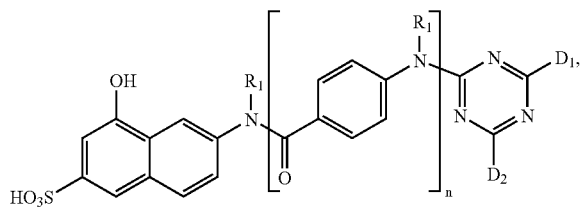

(6)

whereby

A, $R_1$, $D_1$, $D_2$ and n are as defined in claim 1.

12. A solid dye preparation for dyeing paper, comprising a compound of the formula (1) and/or (2), according to claim 1, and further auxiliaries.

13. Aqueous solutions for dyeing paper, comprising a compound of the formula (1) and/or (2), according to claim 1, and, optionally, further auxiliaries.

14. Aqueous solutions according to claim 13 containing, as further auxiliaries, solubilizers and/or organic solvents.

15. Paper which is dyed with a compound of the formula (1) and/or (2), according to claim 1.

16. Paper which is dyed with a compound of the formula (1) and/or (2), in the form of a solid dye preparation according to claim 12.

17. Paper which is dyed with a compound of the formula (1) and/or (2) in the form of an aqueous solution according to claim 13.

* * * * *